(12) United States Patent
Choi

(10) Patent No.: US 12,077,702 B2
(45) Date of Patent: Sep. 3, 2024

(54) BIODEGRADABLE COATING COMPOSITION FOR MULCHING PAPER AND MULCHING PAPER

(71) Applicant: PAPYRUS CO., LTD, Daejeon (KR)

(72) Inventor: Hyun Hwang Choi, Daejeon (KR)

(73) Assignee: PAPYRUS CO., LTD, Daejeon (KR)

( * ) Notice: Subject to any disclaimer, the term of this patent is extended or adjusted under 35 U.S.C. 154(b) by 592 days.

(21) Appl. No.: 17/417,511

(22) PCT Filed: Sep. 19, 2019

(86) PCT No.: PCT/KR2019/012123
§ 371 (c)(1),
(2) Date: Jun. 23, 2021

(87) PCT Pub. No.: WO2020/138655
PCT Pub. Date: Jul. 2, 2020

(65) Prior Publication Data
US 2021/0388267 A1    Dec. 16, 2021

(30) Foreign Application Priority Data
Dec. 26, 2018 (KR) .................. 10-2018-0169023

(51) Int. Cl.
| C09K 17/52 | (2006.01) |
| D21H 19/40 | (2006.01) |
| D21H 19/54 | (2006.01) |
| D21H 19/56 | (2006.01) |
| D21H 19/62 | (2006.01) |
| D21H 21/20 | (2006.01) |

(52) U.S. Cl.
CPC ............ *C09K 17/52* (2013.01); *D21H 19/40* (2013.01); *D21H 19/54* (2013.01); *D21H 19/56* (2013.01); *D21H 19/62* (2013.01); *D21H 21/20* (2013.01)

(58) Field of Classification Search
None
See application file for complete search history.

(56) References Cited

FOREIGN PATENT DOCUMENTS

| JP | 2013-172678 A | | 9/2013 |
|---|---|---|---|
| KR | 10-1997-0015691 A | | 4/1997 |
| KR | 10-0545271 B1 | | 1/2006 |
| KR | 10-0643509 B1 | | 11/2006 |
| KR | 10-2009-0012918 A | | 2/2009 |
| KR | 10-2013-0002591 A | | 1/2013 |
| KR | 10-2013-0042748 A | | 4/2013 |
| KR | 20130042748 | * | 4/2013 |
| KR | 10-1347898 B1 | | 1/2014 |
| KR | 101875603 | * | 7/2018 |
| KR | 10-1970536 B1 | | 8/2019 |
| WO | WO 2016/043447 | * | 3/2016 |

OTHER PUBLICATIONS

Machine translation of Kim et al. WO 2016/043447 (Year: 2016).*
Machine translation of Hun et al. KR 101875603 (Year: 2018).*
Machine translation of KR 20130042748 (Year: 2013).*

* cited by examiner

*Primary Examiner* — Robert T Butcher
(74) *Attorney, Agent, or Firm* — You & IP, LLC

(57) ABSTRACT

Disclosed are a biodegradable coating composition for a mulching paper and a mulching paper. Out of these, the biodegradable coating composition for mulching paper to be coated on a surface of mulching paper comprises: spring water prepared by immersing a mineral substance powder that includes sericite powder and has a particle size distribution of 400 to 700 mesh in a container containing water for 10 to 20 days and thus dissolving a mineral component of a mineral substance in water at 45 to 72 parts by weight; charcoal powder having a particle size of 1,000 to 3,000 mesh at 3 to 8 parts by weight; calcium solution at 8 to 13 parts by weight; a filler including sulfur powder, illite powder, and expanded vermiculite powder at 5 to 15 parts by weight; starch at 5 to 8 parts by weight; and an additive at 10 to 20 parts by weight.

9 Claims, 1 Drawing Sheet

BIODEGRADABLE COATING COMPOSITION FOR MULCHING PAPER AND MULCHING PAPER

TECHNICAL FIELD

The present invention relates to the field of mulching paper to be covered on the surface of soil in which crops are growing. Specifically, the present invention relates to a biodegradable coating composition to be coated on the surface of mulching paper, and the mulching paper coated therewith.

BACKGROUND ART

A mulching refers to covering the surface of arable land when growing crops, and it is practiced for the purpose of preventing soil erosion, maintaining soil moisture, controlling geothermal temperature, controlling weeds, preventing soil infectious pathogens, and preventing soil contamination.

In other words, the mulching is a method of covering the soil surface of cultivated crops taking roots, has an erosion prevention effect that prevents the furrow, where the cultivated crops take roots, from being lost due to water damage, and plays a role of controlling moisture for cultivated crops within a certain range by suppressing the evaporation of moisture, which is essential for growth.

In addition, the mulching physically blocks sunlight required for growth to other plants except cultivated crops, thereby controlling weeds along with the geothermal control function. Also, the use of herbicides for weed removal is suppressed by hindering the growth of plants unnecessary for cultivation as much as possible, thereby preventing soil contamination.

As the mulching material used for such mulching, eco-friendly materials such as rice straw, barley straw, and grass were used. In recent years, synthetic resin materials such as polyethylene, polyvinyl chloride, etc., which are easy to work and easy to secure, have been used.

However, unlike vinyl for a vinyl house exposed on the road surface, the vinyl materials must be collected when the cultivation of the crop is finished after being buried in the soil. In this case, not only the work intensity for recovery is high, but also it is difficult to remove the vinyl materials by force due to the aging of rural manpower, and the mulching materials of vinyl materials, that has not been removed, permanently remains in some soil, causing environmental pollution.

In other words, recent vinyl mulching materials use a lot of low-cost and simple vinyl resins, which are easy to maintain moisture or heat retention in the soil, but there is a problem in that the growth of crop roots is not vigorous due to insufficient oxygen supply to the soil. In addition, there is a hassle of removing the used vinyl mulching materials in order to cultivate other crops after crop harvesting. Also, it is difficult to remove the materials completely, leaving residues in the soil, which intensifies soil contamination. Therefore, not only causes a hindrance to the growth of the roots of the following crops, but also increases the number of vinyl mulching materials that are not removed year by year, causing serious problems.

In order to solve this problem, studies on mulling materials that can be biodegradable in natural conditions has been conducted. As an example, Korean Patent Registration No. 10-0545271 discloses an aerobic biodegradable agricultural mulching film, wherein the biodegradable agricultural mulching film is formed by mixing a plastic resin with a biodegradable compound, in which stearic acid, medium calcium carbonate, vinyl ketone copolymer, polyethylene wax, lactose, ethyl acetate, methacrylate, powdered milk, isobutyl alcohol, benzene, and LMPE are mixed, to be extruded. At this time, the biodegradable compound comprises 1 to 4 wt % of stearic acid, 30 to 55 wt % of calcium carbonate, 4 to 12 wt % of vinyl ketone copolymer, 3 to 8 wt % of polyethylene wax, 7 to 15 wt % of lactose, 1 to 5 wt % of ethyl acetate, 1 to 7 wt % of methyl methacrylate, 10 to 20 wt % of powdered milk, 1 to 5 wt % of isobutyl alcohol, 1 to 4 wt % of benzene, and 2 to 7 wt % of LMPE.

In Korean Patent Registration No. 10-0545271, biodegradable compounds as well as base polymers can be biodegraded by microorganisms in the soil even if they are exposed to the outside by irradiation of ultraviolet rays or buried in the soil by mixing a predetermined amount of a biodegradable compound and a base polymer, so that it provides an effect that can be widely used in the eco-friendly mulching farming methods etc. However, since a plastic resin is used as a basic polymer, there is a problem that natural decomposition by soil microorganisms is not satisfactory.

As another example, Korean Patent Publication No. 10-2009-0012918 discloses a natural mulching material, wherein the natural mulching material is prepared by adhering 20-50 wt % of the swollen rice hulls, sawdust or their mixture to 50-80 wt % of natural cotton, and compressing the obtained one.

In Korean Patent Publication No. 10-2009-0012918, the natural mulching material is composed of only natural materials such as natural cotton, swollen rice hulls (sawdust), and natural adhesive, so that the soil can be breathed even if it is covered with the roots of crops and the roots of crops can grow robustly, thereby increasing the productivity of crops as well as suppressing the occurrence of weeds. In addition, as it is naturally decomposed by soil microorganisms, it provides an effect that does not require separate removal measures. However, there is a problem that the insect repellency and maintenance stability are deteriorated.

As further another example, Korean Patent Registration No. 10-1347898 discloses an eco-friendly biodegradable mulching material comprising 16 to 36% by weight of natural cotton; 7 to 17% by weight of natural rayon, natural hemp, or fiber raw materials of a mixture thereof; 3 to 23% by weight of natural fibers extracted from one or more selected from coconut, almond, sugar cane, or bamboo; 15 to 35% by weight of natural adhesive which is vegetable glue or animal glue; 1 to 2% by weight of pigment; and 0.1 to 20% by weight of additives.

In Korean Patent Registration No. 10-1347898, since the eco-friendly biodegradable mulching material is made up of natural materials, the soil respiration is possible if the mulching material covers around the roots of crops, and also the mulching material is biodegraded by soil microbes so that the extra removal process is not necessary, thereby having an effect in reducing manpower. Also the mulching material prevents soil pollution by emitting various harmful gases and considerably affects the crop harvest since the resistance to disease and insect pests, or growth of harmful microorganisms becomes stronger by an increase of dissolved oxygen. Especially, the mulching material has effects in being prey to effective microorganisms in degradation process, inhibiting the germination and growth of weeds by blocking penetration of sun light, and being a good raw material for compost by the restoration of ecosystem and growth of the effective microorganisms. In addition, it provides an effect that can prevent cold damage of crops. However, as in Korean Patent Publication No. 10-2009-0012918 described above, there is a problem in that insect repellency and maintenance or preservation safety are deteriorated.

DISCLOSURE

Technical Problem

An object of the present invention is to provide a biodegradable coating composition for mulching paper that contains a biodegradable and nature-friendly material to prevent soil contamination, contains nutrients necessary for the growth of crops to help crops to be in good conditions during the biodegradation process, and contains a functional component having a control effect.

Another object of the present invention is to provide a mulching paper coated with the biodegradable coating composition.

The technical problems to be achieved in the present invention are not limited to the technical problems mentioned above, and other technical problems that are not mentioned can be clearly understood by those of ordinary skill in the technical field to which the present invention belongs from the following description.

Technical Solution

According to one aspect of the present invention so as to accomplish these objects, there is provided to a biodegradable coating composition for mulching paper to be coated on a surface of mulching paper, the biodegradable coating composition including: spring water prepared by immersing a mineral substance powder that includes sericite powder and has a particle size distribution of 400 to 700 mesh in a container containing water for 10 to 20 days and thus dissolving a mineral component of a mineral substance in water at 45 to 72 parts by weight; charcoal powder having a particle size of 1,000 to 3,000 mesh at 3 to 8 parts by weight; calcium solution at 8 to 13 parts by weight; a filler including sulfur powder, illite powder, and expanded vermiculite powder at 5 to 15 parts by weight; starch at 5 to 8 parts by weight; and an additive at 10 to 20 parts by weight.

Preferably, the mineral substance powder includes germanium powder at 0.2 to 2 parts by weight, bentonite powder at 0.2 to 2 parts by weight, bamboo charcoal powder at 0.5 to 0.9 part by weight, elvan powder at 0.5 to 1 part by weight, cerium powder at 0.5 to 1 part by weight, and cinnabar powder at 0.5 to 1 part by weight with respect to 100 parts by weight of the sericite powder, and the mineral substance powder further includes at least one or more of zeolite powder at 0.1 to 0.5 part by weight, kaolite powder at 0.1 to 0.5 part by weight, or talc powder at 0.1 to 0.5 part by weight.

Preferably, the additive includes a viscosity modifier at 5 to 12 parts by weight, a plasticizer at 2 to 4 parts by weight, a dispersant at 1 to 5 parts by weight, and caustic soda at 1 to 3 parts by weight.

Preferably, the starch includes one or more selected from corn starch, waxy corn starch, potato starch, sweet potato starch, wheat starch, tapioca starch, rice starch, or modified starch thereof.

According to another aspect of the present invention, there is provided to a mulching paper comprising the biodegradable coating composition for mulching paper coated on at least one side of the mulching paper.

Preferably, the mulching paper is manufactured by adding an aid composition to paper slurry during a manufacturing process of the mulching paper to improve tensile strength and wet strength, wherein the aid composition is a paper-making aid composition containing anionic dialdehyde-modified polyacrylamide (GPAM) and polyamide polyamine epichlorohydrin (PAE) resin, and a mass ratio of PAE resin to anionic GPAM is 5:1 to 1:16.

Advantageous Effects

The biodegradable coating composition for mulching paper and the mulching paper according to the present invention are biodegradable since the coating composition contains a nature-friendly material so that the problem of soil contamination can be solved, and biodegrade in the natural state by microorganisms after a certain period of time elapses so that the mulching paper is not required to be separately removed and the labor can be saved.

The biodegradable coating composition for mulching paper and the mulching paper contain nutrients necessary for the growth of crops to help crops to be in good conditions without separate fertilization work. In particular, the mineral components of spring water and charcoal prevent nutrient deficiency in the soil.

The biodegradable coating composition for mulching paper and the mulching paper contain charcoal to exert an antiseptic effect, a filtering effect, a humidity controlling effect, an anion generating effect, a far-infrared radiating effect, a deodorizing effect, and the like.

The biodegradable coating composition for mulching paper and the mulching paper contain sulfur to exert a heavy metal detoxifying effect and mothproofing and sterilizing effects.

The effects of the present invention are not limited to the above effects, and should be understood to include all effects that can be deduced from the configuration of the invention described in the detailed description or claims of the present invention.

BRIEF DESCRIPTION OF DRAWINGS

The above and other objects, features and advantages of the present invention will be more apparent from the following detailed description taken in conjunction with the accompanying drawings, in which.

REFERENCE SIGNS LIST

Figure 1:
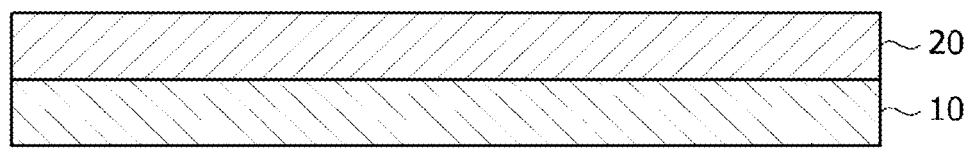
FIG. 1 is an embodiment of a mulching paper according to the present invention.

10: mulching paper
20: coating composition

BEST MODE

Mode for Invention

The present invention may be implemented in a number of different forms, and therefore is not limited to the embodiments described herein.

Throughout the specification, when a part is said to be "connected (connected, contacted, bonded)" with another part, it is not only "directly connected", but also "indirectly connected" with another member in the middle thereof. In addition, when a part "includes" a certain component, it means that the component may further include other components, not to exclude other components, unless otherwise specified.

The terms used in the present specification are only used to describe specific embodiments, and are not intended to limit the present invention. The singular expression includes plural expressions unless it is apparently different in the context. The terms such as "include"" or "have" in this application intend to designate that the feature, number, stage, movement, component, part or the combination described in the specification. Therefore, it will be understood that the existence or the additional possibility of one or more than one different features, numbers, stages, actions, components, parts and the combination is not excluded in advance.

Hereinafter, embodiments of the biodegradable coating composition for mulching paper and the mulching paper according to the present invention will be described.

First, the biodegradable coating composition for mulching paper may contain spring water, charcoal powder, calcium solution, a filler, starch, and an additive. Here, the viscosity of the biodegradable coating solution of the coating composition may be adjusted to 100 to 500 cps depending on the kind of crop at the time of application and then the biodegradable coating solution may be applied to the mulching paper to be described later. In other words, the viscosity may be decreased to increase the decomposition rate when the growth rate of crops is fast, and the viscosity may be increased to decrease the decomposition rate when the growth rate is slow.

The spring water is prepared by immersing a mineral substance powder including sericite powder in a container containing water for 10 to 20 days and thus dissolving a mineral component of sericite in water. A mineral substance powder, particularly the mineral component of sericite powder, is concentrated in this spring water, and thus the efficacy of sericite may be further increased.

The proper ratio of spring water blended is preferably 45 to 72 parts by weight with respect to 100 parts by weight of the coating composition. When the spring water is contained in an amount less than this, the viscosity of the coating composition is too thin and the adhesive strength decreases when the coating composition is applied to the mulching paper. When the spring water is contained in an amount more than this, the viscosity is too thick and a problem arises in that it is difficult to spray the coating solution to the mulching paper at the time of spraying.

In the above, in the mineral substance powder, germanium powder, bentonite powder, bamboo charcoal powder, elvan powder, cerium powder, and cinnabar powder may be mixed with sericite powder which is the main material. The mineral substance powder preferably has a particle size distribution of 400 to 700 mesh. When the particle size distribution is smaller or larger than this, the minerals contained in mineral substances may not be sufficiently dissolved in water and the solubility efficiency of minerals may decrease.

In the mineral substance powder, with respect to 100 parts by weight of the coating composition, sericite powder may be mixed at 1 to 4 parts by weight, germanium powder at 0.2 to 2 parts by weight, bentonite powder at 0.2 to 2 parts by weight, bamboo charcoal powder at 0.5 to 0.9 part by weight, elvan powder at 0.5 to 1 part by weight, cerium powder at 0.5 to 1 part by weight, and cinnabar powder at 0.5 to 1 part by weight.

Sericite powder which is the main material of the mineral substance powder is composed of natural ore containing chemical components such as $Al_2O_3$ (40% by weight), silicon dioxide ($SiO_2$) (48% by weight), calcium oxide (CaO), magnesium oxide (MgO), iron oxide ($Fe_2O_3$), potassium oxide ($K_2O$), and titanium oxide ($TiO_2$), has a porous particulate structure with a scale-like shape and a platy structure to have excellent adsorption power for physically adsorbing and absorbing organic substances, and is evaluated as natural ore emitting a far superior far-infrared radiant quantity to other ores. The superior far-infrared radiant quantity provides the advantage of helping crop growth and controlling the water content and temperature.

Germanium powder which is one of the subsidiary materials of the mineral substance has the effect of killing harmful fungi. The amount of germanium powder blended is preferably 0.2 to 2 parts by weight with respect to 100 parts by weight of the coating composition. When the amount of germanium powder blended is less than 0.2 part by weight, the effect of killing harmful fungi is low. When the amount of germanium powder blended exceeds 2 parts by weight, germanium powder may inhale and kill fungi that are beneficial to crops or soil.

Bentonite powder which is one of the subsidiary materials of the mineral substance has an interlayer structure to inhale harmful fungi existing in the soil into between the layers and kill the harmful fungi and swells 10 to 20 times the weight and discharges inorganic substances through ion exchange to exert an effect of supplying nutrients to the soil and crops. The amount of bentonite powder blended is preferably 0.2 to 2 parts by weight with respect to 100 parts by weight of the coating composition. When the amount of bentonite powder blended is less than 0.2 part by weight, the effect of killing harmful fungi is low. When the amount of bentonite powder blended exceeds 2 parts by weight, there is the possibility that bentonite powder inhales and kills fungi that are beneficial to crops or soil.

Bamboo charcoal powder which is one of the subsidiary materials of the mineral substance has an adsorbing action to remove unpleasant odors generated when the mulching paper is decomposed and has sterilizing power to suppress excessive bacterial growth when the mulching paper is decomposed. The amount of bamboo charcoal powder blended is preferably 0.5 to 0.9 part by weight with respect to 100 parts by weight of the coating composition. When the amount of bamboo charcoal powder blended is less than 0.5 part by weight, the effect of suppressing the growth of bacteria is low. When the amount of bamboo charcoal powder blended exceeds 0.9 part by weight, it is possible to suppress the growth of bacteria necessary for the decomposition of mulching paper.

Elvan powder which is one of the subsidiary materials of the mineral substance weakly alkalizes water to improve the water quality and decomposes harmful bacteria in the water to supply clean water to crops. The amount of elvan powder blended is preferably 0.5 to 1 part by weight with respect to 100 parts by weight of the coating composition. When the amount of elvan blended is less than 0.5 part by weight, the effect of improving water quality may be low. When the amount of elvan powder blended exceeds 1 part by weight, even beneficial bacteria in water may be decomposed.

Cerium powder which is one of the subsidiary materials of the coating composition may activate the cultivation speed. The amount of cerium powder blended is preferably 0.5 to 1 part by weight with respect to 100 parts by weight of the sericite powder. When the amount of cerium powder blended is less than 0.5 part by weight, the effect of improving the cultivation speed of crops may be insignificant. When the amount of cerium powder blended exceeds 1 part by weight, the decomposition rate of the mulching paper may slow down.

Cinnabar powder which is one of the subsidiary materials of the mineral substance is a reddish underground ore and may activate the cultivation speed of crops. The amount of cinnabar powder blended is preferably 0.5 to 1 part by weight with respect to 100 parts by weight of the sericite powder. When the amount of cinnabar powder blended is less than 0.5 part by weight, the effect of improving the cultivation of crops may be insignificant. When the amount of cinnabar powder blended exceeds 1 part by weight, the decomposition rate of the mulching paper may slow down.

In addition to the above materials, the mineral substance according to the present invention may further include at least one or more of zeolite at 0.1 to 0.5 part by weight, kaolite at 0.1 to 0.5 part by weight, or talc at 0.1 to 0.5 part by weight.

As the zeolite, natural zeolite may be used. Zeolite is one of the crystalline aluminosilicates. Zeolites refer to a group of white or colorless hydrated aluminosilicate minerals containing similar components to those of feldspar as the main constituent metals thereof are sodium, calcium, and potassium. Zeolites have fine pores, a molecular sieving action, and a cation exchange capacity. Zeolites may be used as ion exchangers, adsorbents and catalysts. Zeolites have the function to remove harmful substances such as heavy metals and dioxins. Zeolites may diminish the action of nitrosamines.

Kaolite is a material having a high water absorption rate. Kaolite is highly absorbent and thus has adhesive property, and plays a role of attaching the mulching paper to the ground.

Talc is a soft rock containing magnesium as the main component and may nourish the soil.

As described above, zeolite, kaolite, and talc each have favorable efficacy, and thus any one or all of these may be included. However, it will be required to decide whether to include these in consideration of the redundancy in terms of efficacy with other powders.

Charcoal powder is for blocking sunlight and preventing damages by blight and harmful insects, has a particle size of 1,000 to 3,000 mesh, and may be included at 3 to 8 parts by weight with respect to 100 parts by weight of the coating composition. When charcoal powder is mixed at less than 3 parts by weight, the effect of blocking sunlight and preventing damages by blight and harmful insects is not favorable. When charcoal powder is mixed at 8 parts by weight or more, there is a problem that the adhesive strength decreases.

In addition to these, wood vinegar and germanium powder may be further included at 30 to 40 parts by weight and 20 to 50 parts by weight with respect to 100 parts by weight of charcoal powder for the purpose of blocking sunlight. At this time, when wood vinegar is mixed at less than 30 parts by weight, the effect of preventing damages by blight and harmful insects and promoting the decomposition of mulching paper is insufficient. When the amount of wood vinegar exceeds 40 parts by weight, there is a problem that the manufacturing cost increases. When germanium powder is mixed at less than 20 parts by weight, the effect of preventing damages by blight and harmful insects is insufficient. When the amount of germanium powder exceeds 50 parts by weight, there is a concern that the adhesive strength and the tensile strength of the mulching paper may decrease.

Calcium solution is for strengthening the roots of crops and may be included at 8 to 13 parts by weight with respect to 100 parts by weight of the coating composition. When calcium solution is included in an amount less than this, the function to strengthen the roots of crops is weak. When calcium solution is included in an amount more than this, the cost-effectiveness decreases as compared to the efficacy.

Meanwhile, the calcium solution may be replaced with calcium powder prepared by crushing and cutting starfish, then drying the crushed starfish with hot air, pulverizing the dried starfish, and calcining the pulverized starfish at 1000° C. to 1200° C. for 1 to 2 hours.

When the calcination is completed, the calcium powder becomes grayish white ash, and the grayish white ash may be used as it is, but a more favorable high calcium material is obtained through the following process. In other words, the grayish white ash is added with purified water to prepare a solution, then an organic acid (acetic acid, lactic acid, citric acid, or the like) is mixed with this solution, and the mixture is stirred for 2 to 4 hours, subjected to a high pressure and high temperature treatment at 120° C. to 150° C. for 1 hour, and filtered and cooled to obtain strong alkaline mineral electrolyzed water that has a pH of 12 or higher and contains ionized calcium. When an ionized solution is subjected to a high pressure and high temperature treatment, the organic acid is removed, and thus the ionized solution becomes strong alkaline again and, at the same time, the ionized concentration increases. The high pressure and high temperature treatment does not significantly affect the ionized concentration in the range of 120° C. to 150° C. This electrolyzed water becomes a powder containing calcium at 90% by weight or more when freeze-dried. The strong alkaline mineral electrolyzed water powder thus prepared may be used as a high calcium material.

The calcium powder may include any one or more of calcium salts of citric acid, calcium gluconate, calcium glycerophosphate, calcium oxide, calcium hydroxide, calcium chloride, calcium lactate, calcium phosphate tribasic, calcium phosphate dibasic, calcium phosphate monobasic, or calcium sulfate.

As the filler, sulfur powder, illite powder, and expanded vermiculite powder may be mixed together at a weight ratio of 0.5:0.5:1, and the filler is preferably contained at 5 to 15 parts by weight with respect to 100 parts by weight of the coating composition.

Sulfur (powder) in the above is an oxygen group element belonging to Group 6B in the periodic table, sulfur that has long been known for its existence was used in ancient times for disinfection by burning sulfur and exposing the wound to its smoke, and it has since been widely used as medicine or gunpowder. Sulfur is a yellow nonmetallic solid at room temperature and has a large number of known isotopes. Sulfur is a natural ore, and has been used as a medicine by controlling the poison in sulfur. As the method, sulfur was immersed in loess water mixed with ginger juice and the mixture was boiled fifteen times or sulfur was added to radish and the mixture was boiled nine times to be prepared as a medicine. This sulfur thus prepared as a medicine has been used as a medicine in folk remedies for lack of energy, duodenal ulcers and inflammation, cystitis, coldness, constipation, headache, and the like. For athlete's foot, scabies, swelling, and the like, sulfur powder that is not prepared as a medicine was kneaded with lard, pine resin or the like to be applied to the wound or burnt to expose the wound to its smoke.

Sulfur was also sprayed to restore the soil of the rice fields contaminated with pesticides. The fertility of soil decreases when ginseng is cultivated 4 to 5 times at one field. Sulfur that has the same effect as that of loess has been sprayed to restore the fertility of soil and prevent damages by blight and harmful insects. It has been proposed to prevent damages by blight and harmful insects and to help the growth of vegetables, fruits, and grains by using sulfur instead of various chemical fertilizers or pesticides.

Sulfur (water-soluble sulfur) is an essential component for the growth of crops, is a component that is highly required, and produces the three major amino acids cystine, cysteine, and methionine to improve the taste and aroma of crops and increase the production amount and the quality.

The illite (powder) is a mineralogical composition of feldspar ($K_2O$, $Na_2O \cdot Al_2O_{36}SiO_2$) and muscovite ($\frac{1}{2}K_2O \cdot 3Al_2O_3 \cdot 6SiO_2 \cdot 2H_2O$), contains potassium element, and has an effect of promoting the growth of plants when dissolved in water, for example, even in a small amount since potassium element is one of the nutrients together with nitrogen and oxygen for plants. When such illite is used in the present invention, illite may play a role of promoting crop growth by enhancing the fertility of soil, abundantly supplying oxygen to the crops, and continuously supplying minerals to the crops. Illite is formed at a relatively high temperature as compared to other clay minerals, and potassium ions exist between the layers thereof. It is thus considered that the use of illite will gradually expand in terms of environment when these properties are well utilized. Illite has great effects such as far-infrared radiation, toxic gas adsorption, and anion generation, penetrates the soil and provides a condition for the soil to breathe, and emits a large quantity of far-infrared rays to revive the fertility of impoverished soil and to further revitalize high-quality soil.

Vermiculite generally refers to hydrous mica that is an alteration product of phlogopite or biotite, and is a unique ore that contains three types of water: absorbed water, interlayer water, and crystal water, among ores produced worldwide. When this is rapidly heated at high temperatures, the water in between the layers of vermiculite is vaporized into water vapor to generate pressure. As this pressure is released, vermiculite expands to be expanded vermiculite. Vermiculite thus expanded by heat has a significantly low specific gravity, exhibits excellent thermal insulating property and incombustibility, has a noise blocking effect, a water absorbing effect, a physical shock absorbing effect, and the effect as an extender and a filler, and has excellent cation exchange capacity (CEC) to be in the spotlight as a pollution purifying agent or organic substance adsorbent. Vermiculite, in particular, has a high CEC and thus stores nutrients in the soil therein and elutes the nutrients therefrom to maintain the fertility of soil. Vermiculite is used not only as a soil conditioner since the numerous voids in vermiculite facilitate heat conservation and ventilation and create an optimal environment for the growth of microorganisms, but also as a bed soil material that maintains moisturizing power in the bed soil and serves as a storage warehouse for nutrients when artificial bed soil is prepared. Vermiculite has a greatly favorable conditions for the propagation of beneficial microorganisms and thus is used for spraying by adsorbing microorganisms or nutrients to the vermiculite. The adsorbed microorganisms or nutrients are slowly eluted from the vermiculite according to the surrounding environment, and thus a long-term effect may be expected.

The starch is a component that accelerates the biodegradability of the coating composition according to the present invention, and the kind or form thereof is not greatly limited. For example, in the present invention, the starch may be unmodified starch or modified starch obtained by physically or chemically modifying this starch, or a mixture thereof may be used. Among these, unmodified starch includes corn starch, waxy corn starch, potato starch, sweet potato starch, wheat starch, tapioca starch, rice starch and the like depending on the kind of grain from which the starch is derived, and one or more may be selected from these and used. Modified starch includes acid-treated starch, oxidized starch, esterified starch, oxidized and esterified starch, etherified starch, oxidized and etherified starch, crosslinked starch and the like. Specific examples thereof include acetylated distarch adipate, acetylated distarch phosphate, octenylated starch succinate, distarch phosphate, starch phosphate, phosphated distarch phosphate, starch acetate, hydroxypropyl distarch phosphate, and hydroxypropyl starch, and one or more may be selected from these and used.

The content of starch in the coating composition according to the present invention is preferably 5% to 8% by weight with respect to 100 parts by weight of the coating composition. When the content of starch in the coating composition is less than 5% by weight with respect to 100 parts by weight of the coating composition, the effect of accelerating the biodegradability of the coating composition by the addition of starch may be insufficient. When the content of starch exceeds 8% by weight, physical properties such as tensile strength, elongation at break, and weather resistance of the mulching paper may decrease.

The additive is for controlling the viscosity of the coating composition and preventing starch aggregation, and may include a viscosity modifier, a plasticizer, a dispersant, and caustic soda. The additive may be contained at 10 to 20 parts by weight with respect to 100 parts by weight of the coating composition.

As the composition ratio of the respective components, the plasticizer may be contained at 20 to 40 parts by weight with respect to 100 parts by weight of the viscosity modifier, the dispersant at 10 to 50 parts by weight, and caustic soda at 10 to 30 parts by weight.

Here, the viscosity modifier includes hydroxypropyl methylcellulose, sodium carboxymethylcellulose, chitosan, polyethylene glycol (PEG), polylactic glycolamide (PLGA), polyvinyl alcohol (PVA), dextran, hyaluronic acid, crosslinked hyaluronic acid and the like, and it is possible to select and use one among these.

Figure 2:
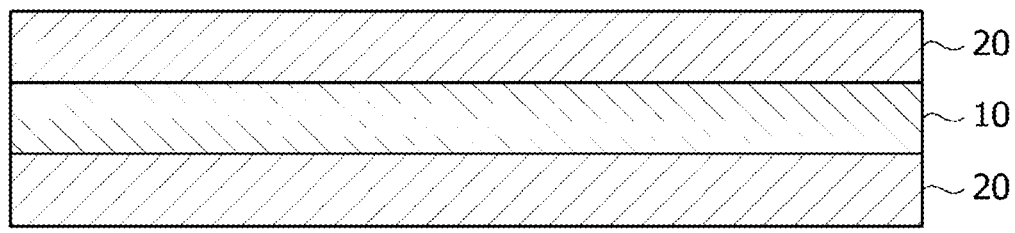
FIG. 2 is another embodiment of a mulching paper according to the present invention.

Meanwhile, the coating composition (20) may be applied to one side of the mulching paper (10) as illustrated in FIG. 1 or both sides of the mulching paper (10) as illustrated in FIG. 2.

As the coating method, the liquid coating composition (20) is applied to one side or both sides of the mulching paper using a coating nozzle while unwinding the mulching paper (10) wound in a roll shape, and the mulching paper coated is allowed to pass through a dryer to solidify the coating composition and then rewound around a rewinder.

Here, the strength of the mulching paper is significantly important since the mulching paper (10) itself is exposed in a natural state for a long period of time not only during installation but also after installation. Moreover, when the mulching paper is applied to rice fields, it is important to have sufficient wet strength since the mulching paper remains submerged in water. To this end, an aid composition is added to paper slurry during the manufacturing process of the mulching paper (10). The aid is a paper-making aid composition containing anionic dialdehyde-modified polyacrylamide (GPAM) and polyamide polyamine epichlorohydrin (PAE) resin, and the mass ratio of PAE resin to anionic GPAM may be about 5:1 to about 1:16.

Incidentally, the method for adding the PAE resin and anionic GPAM in order to increase the tensile strength of the mulching paper is not particularly limited in the paper making process.

The two components may be added to the pulp individually or simultaneously, or the two components may be first mixed with each other to form a pre-mixed strength agent and then added to the pulp. However, it is preferred that the two components are supplied by individual addition methods as described above.

The strength agent for dialdehyde-modified polyacrylamide paper making may be prepared by modifying a polyacrylamide-type base polymer with dialdehyde. Dialdehyde-modified polyacrylamide-type strength agents are usually used as dry strength agents, and some of these may be used to provide wet strength and drainage property to the paper.

The dialdehyde-modified polyacrylamide used in the present Example is anionic. Correspondingly, the polyacrylamide-type base polymer is also anionic.

Anionic polyacrylamide-type base polymers are copolymers of one or more acrylamide monomer(s) and one or more anionic monomer(s). For example, the anionic polyacrylamide-type base polymer described in WO 0011046 A1 is applicable to the present invention and to the corresponding dialdehyde-modified polyacrylamide and a method for preparing the same. The entire contents described in these documents are incorporated herein by reference.

An "acrylamide monomer" means a monomer represented by the following [Chemical Formula 1].

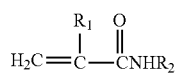

[Chem. 1]

Where $R_1$ is H or C1-C4 alkyl, and $R_2$ is H, C1-C4 alkyl, aryl or arylalkyl. Preferably, the acrylamide monomer is, for example, acrylamide or methacrylamide.

TABLE 1

| Composition ratio and ratio of aid (mass ratio) | Amount of aid added (kg/t) | Dry tensile strength (N · m/g) | Rate of increase in dry tensile strength (%) | Wet tensile strength (N · m/g) | Rate of increase in wet tensile strength (%) |
|---|---|---|---|---|---|
| Blank | | 21.1 | | 1.44 | |
| 100% PAE | 3 | 23.77 | 12.7 | 4.94 | 243.1 |
| 100% PAE | 6 | 26.11 | 23.7 | 6.15 | 327.1 |
| 100% GPAM | 3 | 20.02 | −5.1 | 1.66 | 15.3 |
| 100% GPAM | 6 | 20.6 | −2.4 | 1.69 | 17.4 |
| PAE:GPAM = 1.25:1 | 3 | 26.34 | 24.8 | 5.25 | 264.6 |
| PAE:GPAM = 1.25:1 | 6 | 32.17 | 52.5 | 7.49 | 420.1 |

As can be seen from Table 1, in the case of using a combination of PAE resin and anionic GPAM at a mass ratio of about 1.25:1 according to the present invention as a strength agent, the dry tensile strength and the wet tensile strength are more favorable and the tensile strength further increases as compared to the case of using PAE resin or GPAM singly in the same amount.

Hereinafter, the physical properties of the mulching paper coated with the coating composition were measured as follows.

[Tensile Strength]

The strength at break (kg/cm²) of the sample was measured in conformity with the 76 tensile strength testing method of KS M3503 in each of the machine direction (MD) and the transverse direction (TD) perpendicular to the machine direction (MD) and the lowest value was taken.

[Biodegradability]

The biodegradability was evaluated by measuring the amount of carbon dioxide generated from the standard sample (cellulose) and the test sample in conformity with KS M3100-1 the method for measuring the aerobic biodegradability of plastic under composting conditions.

Biodegradability (%)=(amount of carbon dioxide generated/amount of theoretical carbon dioxide)×100

The status of the coating composition applied to the mulching paper of the present invention is as presented in the following Table 2.

TABLE 2

| | Unit: parts by weight | | | | |
|---|---|---|---|---|---|
| Item | Example 1 | Example 2 | Example 3 | Example 4 | Example 5 |
| Spring water | 45 | 54 | 60 | 70 | 72 |
| Charcoal powder | 3 | 5 | 7 | 7 | 8 |
| Calcium solution | 5 | 11 | 11 | 12 | 13 |
| Filler | 5 | 8 | 10 | 13 | 15 |
| Starch | 5 | 6 | 7 | 7 | 8 |
| Additive | 10 | 13 | 15 | 16 | 20 |

The results of physical property evaluation according to Example of the present invention are as presented in the following Table 3.

TABLE 3

| Item | Example 1 | Example 2 | Example 3 | Example 4 | Example 5 |
|---|---|---|---|---|---|
| Tensile strength (kg/cm²) | 9.3 | 11.4 | 17.4 | 16.2 | 16.5 |
| Elongation (%) | 522 | 511 | 495 | 491 | 488 |
| Biodegradability (25 days, %) | 82 | 84 | 86 | 87 | 90 |

Figure 3:
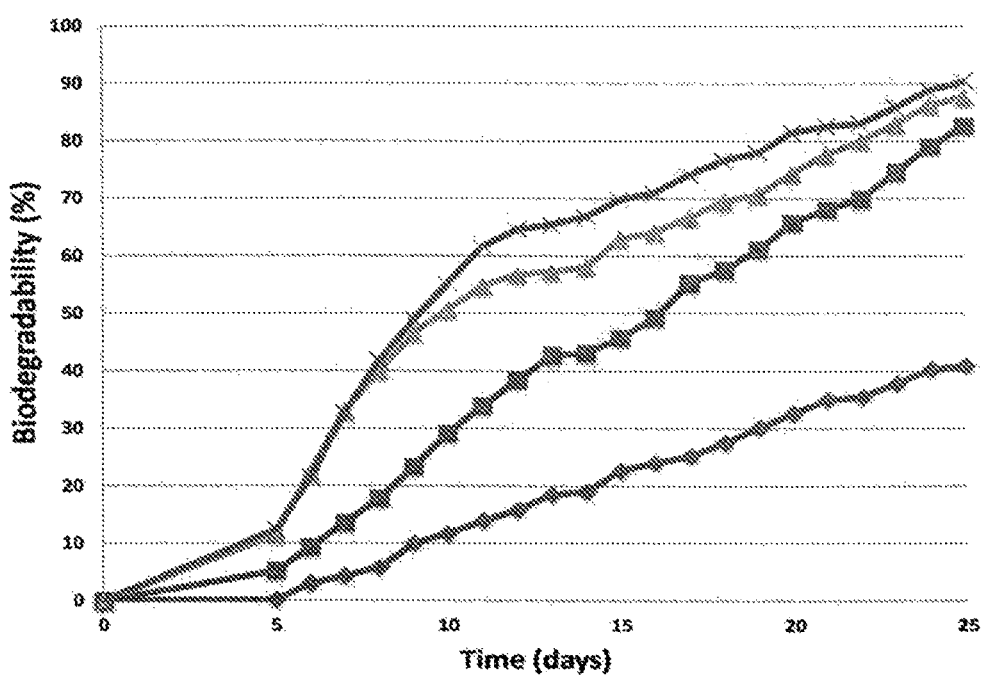
FIG. 3 is an experimental graph of biodegradability of mulching paper coated with a biodegradable coating composition according to the present invention.

As presented in Table 3 above, in Examples 1 to 5 according to the present invention, it has been confirmed that the biodegradability on the 25th day is as excellent as 82% to 90% while the mechanical properties do not decrease as the tensile strength is 9.3 to 17.4 kg/cm² and the elongation is 488% to 522%. Also, in the biodegradability testing results illustrated in FIG. 3, the first graph (-X-X-) from the top of the graph is a biodegradable film for short-term use, namely, a short-term biodegradable film, the second graph (-▲-▲-) from the top is a biodegradable film for medium-term use, namely, a medium-term biodegradable film, and the third graph (-■-■-) from the top is a biodegradable film for long-term use, namely, a long-term biodegradable film. The biodegradabilities of these film are all more favorable than that of a polybutylene adipate-co-terephthalate (PBAT)-based biodegradable film (lowermost graph in FIG. 3: -♦-♦-).

The biodegradability of the short-term biodegradable mulching paper rapidly increased from 12% to 62% from the 5th day to the 11th day of the experiment, and the rate of increase slowed down slightly from then on, but the short-term biodegradable mulching paper biodegraded in proportion to the period of time and biodegraded up to 90% on the 25th day. The biodegradability of the medium-term biodegradable mulching paper rapidly increased from 11% to 55% from the 5th day to the 11th day of the experiment, and the rate of increase was insignificant from the 13th day to the day 14th. From then on, the rate of increase was slightly slower than that of the first 5th to 11th days, but the medium-term biodegradable mulching paper biodegraded in proportion to the period of time and biodegraded up to 87% on the 25th day. The biodegradability of the long-term biodegradable mulching paper rapidly increased from 5% to 42% from the 5th day to the 11th day of the experiment, and the rate of increase was insignificant from the 13th day to the 14th day. From then on, the long-term biodegradable mulching paper biodegraded at the rate of increase of the first 5th to 11 days and biodegraded up to 82% on the 25th day.

The reason for the difference between the biodegradation result in the physical property evaluation and the biodegradation result in the actual soil reclamation is considered to be because the optimal condition for microbial propagation is maintained in the laboratory and thus the microbial propagation is favorable in the physical property evaluation but the supply of water for microbial propagation depends on the nature and thus the microbial propagation condition is not favorable in the actual soil reclamation. However, it can be seen that biodegradation favorably proceeds even in the actual soil reclamation.

Examples 1 and 2 correspond to the long-term biodegradable mulching paper, Examples 3 and 4 correspond to the medium-term biodegradable mulching paper, and Examples 5 and 6 correspond to the short-term biodegradable mulching paper.

While the present invention has been described with respect to the specific embodiments, it will be apparent to those skilled in the art that various changes and modifications may be made without departing from the spirit and scope of the invention as defined in the following claims.

The invention claimed is:

1. A biodegradable coating composition to be coated on a surface of mulching paper, the biodegradable coating composition comprising:
   45 to 72 parts by weight of spring water, wherein the spring water includes mineral components prepared by immersing mineral substance powder with a particle size distribution of 400 to 700 mesh in a container containing water for 10 to 20 days, and the mineral substance powder includes sericite powder;
   3 to 8 parts by weight of charcoal powder having a particle size of 1,000 to 3,000 mesh;
   8 to 13 parts by weight of calcium solution;
   5 to 15 parts by weight of a filler, wherein the filler includes sulfur powder, illite powder, and expanded vermiculite powder;
   5 to 8 parts by weight of starch; and
   10 to 20 parts by weight of an additive.

2. The biodegradable coating composition according to claim 1, wherein the mineral substance powder includes, with respect to 100 parts by weight of the biodegradable coating composition:
   1 to 4 parts by weight of sericite powder,
   0.2 to 2 parts by weight of germanium powder,
   0.2 to 2 parts by weight of bentonite powder,
   0.5 to 0.9 part by weight of bamboo charcoal powder,
   0.5 to 1 part by weight of elvan powder,
   0.5 to 1 part by weight of cerium powder, and
   0.5 to 1 part by weight of cinnabar powder, and
   at least one or more of, 0.1 to 0.5 part by weight of zeolite powder, 0.1 to 0.5 part by weight of kaolite powder, or 0.1 to 0.5 part by weight of talc powder.

3. The biodegradable coating composition according to claim 1, wherein the additive includes 20 to 40 parts by weight of a plasticizer, 10 to 50 parts by weight of a dispersant, and 10 to 30 parts by weight of caustic soda, with respect to 100 parts by weight of a viscosity modifier.

4. The biodegradable coating composition according to claim 1, wherein the starch includes one or more selected from corn starch, waxy corn starch, potato starch, sweet potato starch, wheat starch, tapioca starch, rice starch, or modified starch thereof.

5. Mulching paper comprising the biodegradable coating composition according to claim 1 coated on at least one side of the mulching paper.

6. The biodegradable coating composition according to claim 4, wherein
   the mulching paper is manufactured by adding an aid composition to paper slurry during a manufacturing process of the mulching paper to improve tensile strength and wet strength, wherein
   the aid composition is a paper-making aid composition containing anionic dialdehyde-modified polyacrylamide (GPAM) and polyamide polyamine epichlorohydrin (PAE) resin, and a mass ratio of PAE resin to anionic GPAM is 5:1 to 1:16.

7. Mulching paper comprising the biodegradable coating composition according to claim 2 coated on at least one side of the mulching paper.

8. Mulching paper comprising the biodegradable coating composition according to claim 3 coated on at least one side of the mulching paper.

9. Mulching paper comprising the biodegradable coating composition according to claim 4 coated on at least one side of the mulching paper.

* * * * *